(12) United States Patent
Wayne

(10) Patent No.: US 11,897,399 B2
(45) Date of Patent: Feb. 13, 2024

(54) CONSTRUCTION VEHICLE AND FASTENING MEMBER FOR CONSTRUCTION VEHICLE

(71) Applicant: Caterpillar Inc., Peoria, IL (US)

(72) Inventor: Richard Wayne, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 17/141,289

(22) Filed: Jan. 5, 2021

(65) Prior Publication Data

US 2022/0212611 A1    Jul. 7, 2022

(51) Int. Cl.
*F16B 21/02* (2006.01)
*F16B 5/06* (2006.01)
*B60R 13/02* (2006.01)

(52) U.S. Cl.
CPC .......... *B60R 13/0206* (2013.01); *F16B 5/065* (2013.01); *F16B 2005/0671* (2013.01)

(58) Field of Classification Search
CPC ...... F16B 13/0808; F16B 21/02; F16B 5/065; F16B 2005/0671; Y10T 24/4522; A44B 99/005; B60R 13/0206
See application file for complete search history.

(56) References Cited

U.S. PATENT DOCUMENTS

| | | | |
|---|---|---|---|
| 2,011,472 A | 8/1935 | Chobert | |
| 3,123,389 A * | 3/1964 | Biesecker | F16B 5/10 292/241 |
| 3,335,471 A * | 8/1967 | Seckerson | F16B 21/02 24/590.1 |
| 3,514,820 A * | 6/1970 | Rogg | A44B 99/005 24/DIG. 58 |
| 3,693,685 A | 9/1972 | Onufer | |
| 3,909,888 A * | 10/1975 | Funston | A44B 99/005 24/DIG. 58 |
| 5,471,715 A | 12/1995 | Knize | |
| 6,357,090 B1 | 3/2002 | Murai | |
| 9,717,296 B2 | 8/2017 | Stiles et al. | |
| 10,344,786 B2 | 7/2019 | Jodeleit et al. | |
| 2006/0207072 A1* | 9/2006 | Chen | A44B 11/2588 24/590.1 |
| 2007/0059123 A1* | 3/2007 | Tangeman | A61G 13/0018 411/553 |
| 2015/0089778 A1* | 4/2015 | Tisol, Jr. | F16B 21/02 24/663 |
| 2015/0174740 A1* | 6/2015 | Morris | F16B 21/02 29/559 |

* cited by examiner

*Primary Examiner* — Robert Sandy
*Assistant Examiner* — Michael S Lee

(57) ABSTRACT

A construction vehicle includes a panel removably coupled to a vehicle component and fastening member for removably coupling the panel to the vehicle component. The fastening member includes a main body having a lock stud that is movable to switch the fastening member between a locked position and an unlocked position. The fastening member also includes a ring assembly. The ring assembly defines a first portion and a second portion. The first portion includes a base portion and one or more first tabs. The one or more first tabs are inclined relative to the base portion. The first portion further includes one or more second tabs parallel to the base portion. Further, the one or more first tabs and the one or more second tabs together define a seating portion for receiving the lock stud.

20 Claims, 8 Drawing Sheets

CONSTRUCTION VEHICLE AND FASTENING MEMBER FOR CONSTRUCTION VEHICLE

TECHNICAL FIELD

The present disclosure relates to a construction vehicle, and more specifically, to a fastening member for connecting a panel assembly of the construction vehicle with a vehicle component.

BACKGROUND

Construction vehicles, such as motor graders, loaders, excavators, and the like, include various components that are removably coupled with each other. Further, the construction vehicles include various panels that enclose one or more enclosures associated with the construction vehicles. For example, the panel may cover an engine enclosure or a dash in an operator cabin of the machine, or the panel may include a snow cover, a grill, and the like. Typically, fasteners are used to removably couple the panel with a vehicle component. It is essential that the panels are coupled such that they can be quickly and easily removed or coupled as and when required.

Further, it may be advantageous if such panels can be removed or coupled without requiring additional tools and fixtures. Moreover, construction vehicles that operate in challenging environments, such as rocky terrains, are subjected to high amounts of vibration. Thus, it is desirable that the fasteners used for coupling the panels provide a sufficient amount of clamping force for resisting rattling and/or failures due to vibration.

U.S. Pat. No. 9,717,296 describes a locking clip and anchor assembly for a tether. The clip includes an opening with at least one tab extending into a portion of the opening. The clip is also configured to attach to a tether or strap. In exemplary embodiments, the anchor assembly includes a post, biased support, biasing mechanism, and base. The clip is configured to be connectable to the post and movable to latched and unlatched conditions with respect to the anchor assembly. In the latched condition the clip has a limited range of rotation possible about the post.

SUMMARY OF THE DISCLOSURE

In one aspect of the present disclosure, a construction vehicle is provided. The construction vehicle includes a panel removably coupled to a vehicle component. The panel defines a first side and a second side. The construction vehicle also includes a fastening member for removably coupling the panel to the vehicle component. The fastening member is movable between a locked position and an unlocked position. The fastening member includes a main body coupled to the vehicle component. The main body includes a lock stud that is movable to switch the fastening member between the locked position and the unlocked position. The fastening member also includes a ring assembly coupled to the panel. The ring assembly defines a first portion disposed at the first side of the panel and a second portion disposed at the second side of the panel. The first portion includes a base portion. The first portion also includes one or more first tabs projecting from the base portion, wherein the one or more first tabs are inclined relative to the base portion. The first portion further includes one or more second tabs projecting from the base portion and disposed adjacent to the one or more first tabs. The one or more second tabs are parallel to the base portion. Further, the one or more first tabs and the one or more second tabs together define a seating portion that receives a portion of the lock stud when the fastening member is in the locked position.

In another aspect of the present disclosure, a panel assembly is provided. The panel assembly includes a panel removably coupled to a component. The panel defines a first side and a second side. The panel assembly also includes a fastening member for removably coupling the panel to the component. The fastening member is movable between a locked position and an unlocked position. The fastening member includes a main body coupled to the component. The main body includes a lock stud that is movable to switch the fastening member between the locked position and the unlocked position. The fastening member also includes a ring assembly coupled to the panel. The ring assembly defines a first portion disposed at the first side of the panel and a second portion disposed at the second side of the panel. The first portion includes a base portion. The first portion also includes one or more first tabs projecting from the base portion, wherein the one or more first tabs are inclined relative to the base portion. The first portion further includes one or more second tabs projecting from the base portion and disposed adjacent to the one or more first tabs. The one or more second tabs are parallel to the base portion. Further, the one or more first tabs and the one or more second tabs together define a seating portion that receives a portion of the lock stud when the fastening member is in the locked position.

In yet another aspect of the present disclosure, a fastening member for removably coupling a first component to a second component is provided. The fastening member is movable between a locked position and an unlocked position. The fastening member includes a main body coupled to the second component. The main body includes a lock stud that is movable to switch the fastening member between the locked position and the unlocked position. The fastening member also includes a ring assembly coupled to the first component. The ring assembly defines a first portion disposed at a first side of the first component and a second portion disposed at a second side of the first component. The first portion includes a base portion. The first portion also includes one or more first tabs projecting from the base portion, wherein the one or more first tabs are inclined relative to the base portion. The first portion further includes one or more second tabs projecting from the base portion and disposed adjacent to the one or more first tabs. The one or more second tabs are parallel to the base portion. Further, the one or more first tabs and the one or more second tabs together define a seating portion that receives a portion of the lock stud when the fastening member is in the locked position.

Other features and aspects of this disclosure will be apparent from the following description and the accompanying drawings.

DETAILED DESCRIPTION

Wherever possible, the same reference numbers will be used throughout the drawings to refer to the same or the like parts. Wherever possible, corresponding or similar reference numbers will be used throughout the drawings to refer to the same or corresponding parts.

Figure 1:
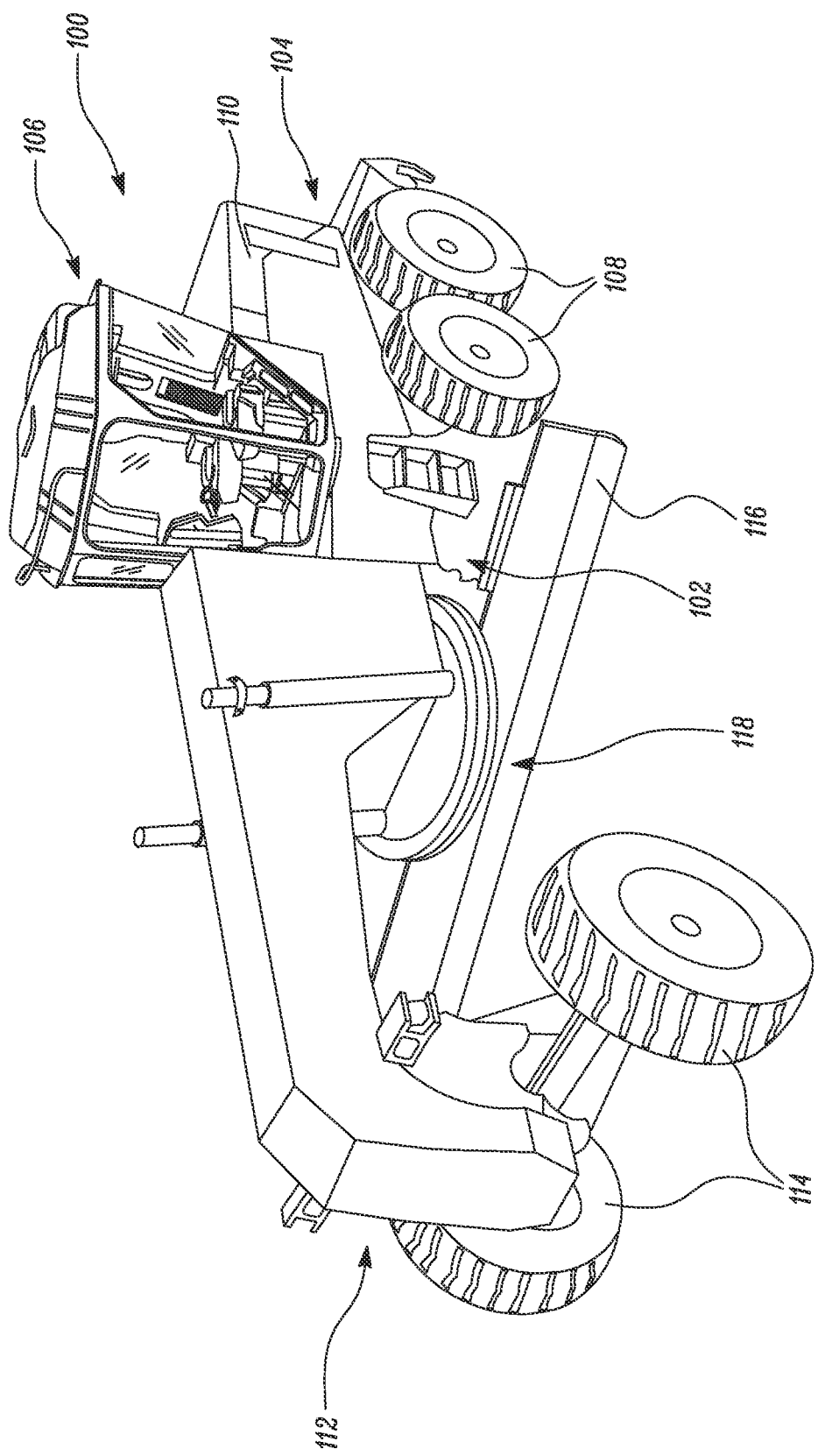
FIG. 1 is a perspective view of an exemplary construction vehicle.

Referring to FIG. 1, an exemplary construction vehicle 100 is illustrated. As shown, the construction vehicle 100 is exemplarily embodied in the form of a motor grader. Although the motor grader is depicted, the present disclosure is not limited to a type of construction vehicle used. It may be understood that the construction vehicle 100 may alternatively include loaders, excavators, tractors, trucks, and the like. In the illustrated example, the construction vehicle 100 may be used to flatten uneven ground surfaces such as during a grading process prior to road construction, moving of snow, debris, and so on.

The construction vehicle 100 includes a main frame 102. The main frame 102 supports various components of the construction vehicle 100, such as an engine disposed within an enclosure 104, an operator cabin 106, and two pairs of rear wheels 108. The engine is covered by a hood 110. The engine may be an internal combustion engine. The engine may include a gasoline engine, a diesel engine, a natural gas engine, and the like. The engine may supply the output power to various components of the construction vehicle 100 for operation thereof.

Further, the construction vehicle 100 includes the operator cabin 106. An operator of the construction vehicle 100 may sit or stand in the operator cabin 106 for performing one or more vehicle operations. The operator cabin 106 may include a user interface (not shown). The user interface may include input and output devices for controlling one or more vehicle components. Further, the operator cabin 106 may include a dash (not shown) that is enclosed by a panel (not shown). The dash may be embodied as a compartment for storing tools, equipment, personal belongings, portable electronic devices, wirings, and the like.

The construction vehicle 100 also includes a front frame 112 coupled to the main frame 102. The front frame 112 supports a pair of front wheels 114, such that the front wheels 114 and the rear wheels 108 allow movement of the construction vehicle 100 on ground surfaces. The front frame 112 also supports a work implement 116. The work implement 116 may be used to perform work operations, such as grading or snow removal. The work implement 116 is positioned between the rear wheels 108 and the front wheels 114. More particularly, the work implement 116 is supported by a Drawbar-Circle-Moldboard (DCM) system 118.

Figure 2:
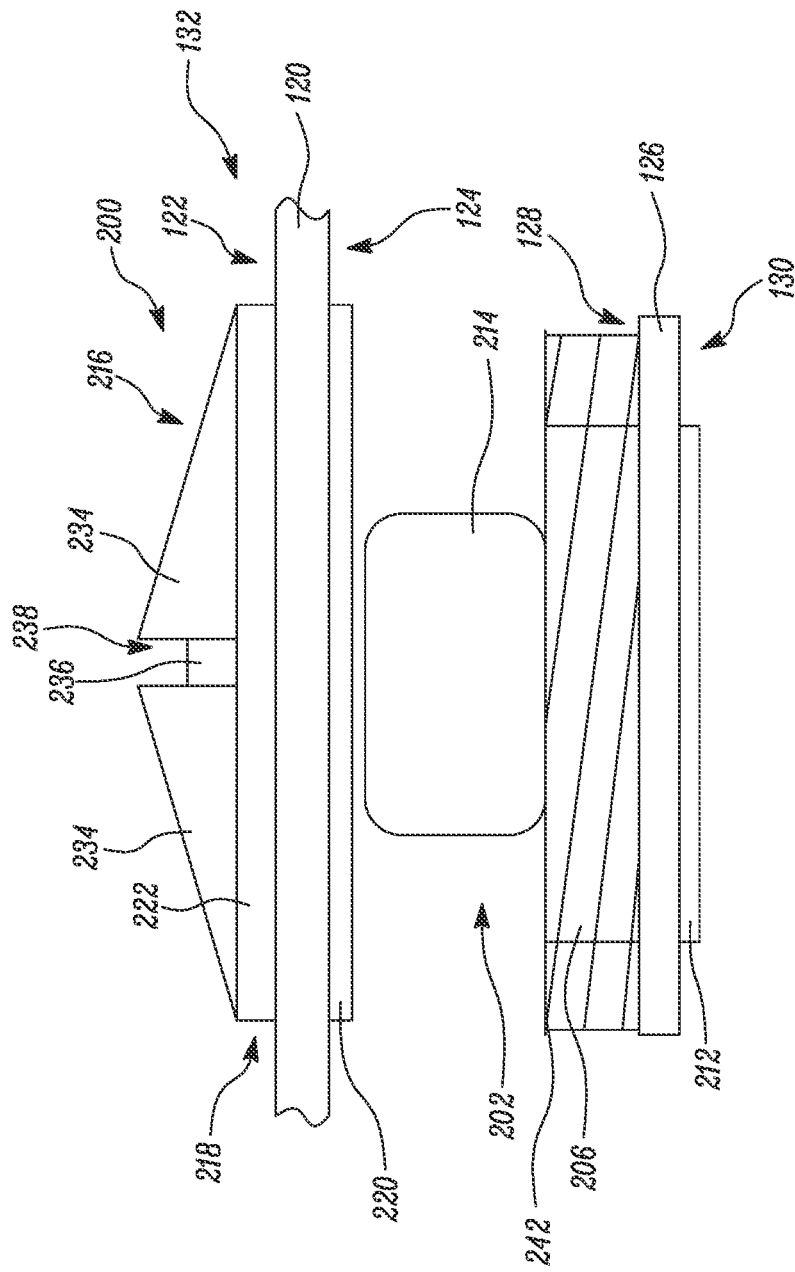
FIG. 2 illustrates a schematic view of a panel assembly having a panel and a fastening member, in accordance with the present disclosure.

As shown in FIG. 2, the construction vehicle 100 includes a panel 120. The panel 120 may be hereinafter interchangeably referred to as "first component 120", without limiting the scope of the present disclosure. The panel 120 may embody the hood 110, the panel of the dash, a snow cover, a grill, and the like. In some examples, the panel 120 may embody any type of panel that encloses a space or compartment on the construction vehicle 100, without any limitations. In other examples, the panel 120 may embody any other component of the construction vehicle 100 that is coupled to an adjacent component of the construction vehicle 100. The panel 120 may have a straight profile, a stepped profile, a concave profile, a convex profile, and the like. It should be noted that the present disclosure is not limited by a shape of the panel 120. The panel 120 defines a first side 122 and a second side 124. The second side 124 is defined opposite the first side 122.

The present disclosure relates to a technique for coupling the panel 120 with a vehicle component 126. The panel 120 is removably coupled to the vehicle component 126, In some examples, the second side 124 of the panel 120 may face the vehicle component 126. The vehicle component 126 may include any portion of the construction vehicle 100 that defines a hollow space for storage of one or more machine parts. Alternatively, the vehicle component 126 may include any portion of the construction vehicle 100 such that the panel 120 is coupled to the vehicle component 126 to realize one or more vehicle functions. The vehicle component 126 may be hereinafter interchangeably referred to as "component 126" or "second component 126", without limiting the scope of the present disclosure. It should be noted that the present disclosure is not limited by a type of the vehicle component 126 or the type of the panel 120.

The construction vehicle 100 includes a panel assembly 132, The panel assembly 132 includes the panel 120 and a fastening member 200. Specifically, the construction vehicle 100 includes the fastening member 200 for removably coupling the panel 120 to the vehicle component 126. It should be noted that a single fastening member 200 may be used to couple the panel 120 to the vehicle component 126 or multiple fastening members 200 may be used to couple the panel 120 to the vehicle component 126. A total number of the fastening members 200 may vary based on the size of the vehicle component 126, the size of the panel 120, a type of fit required, and the like. It should be noted that the total number of fastening members 200 may be such that the fastening members 200 facilitate a tight fit between the vehicle component 126 and the panel 120. The fastening member 200 is movable between a locked position and an unlocked position. In the locked position, any movement of the panel 120 relative to the vehicle component 126 may be restricted. Further, in the unlocked position, the panel 120 may be released or pivoted relative to the vehicle component 126.

Figure 3:
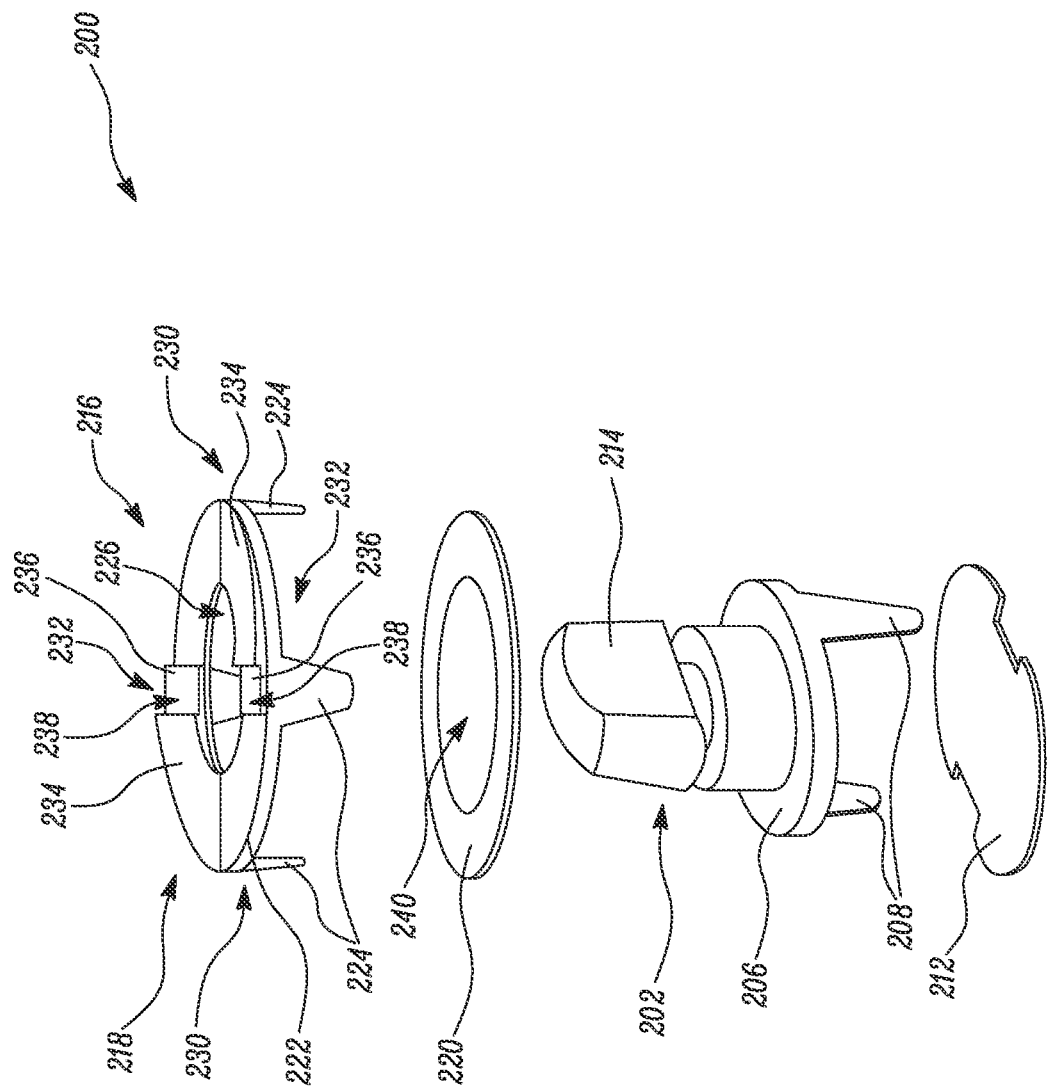
FIG. 3 illustrates an exploded view of the fastening member of FIG. 2.

As shown in FIG. 3, the fastening member 200 includes a main body 202 coupled to the vehicle component 126 (see FIG. 2). The main body 202 is disposed at one side 128 of the vehicle component 126. The main body 202 includes a fixed portion 206 that is coupled to the vehicle component 126. The fixed portion 206 includes a stepped design. The fixed portion 206 includes a generally oval cross-section herein. Alternatively, the fixed portion 206 may include a circular cross-section, a square cross-section, a rectangular cross-section, and the like.

The fixed portion 206 includes a pair of first projections 208. The pair of first projections 208 align and pass through corresponding openings (not shown) in the vehicle component 126 such that the first projections 208 are partially received within the vehicle component 126 and partially project from a side 130 that is opposite to the side 128 of the vehicle component 126. Further, a plate member 212 is disposed at the side 130 of the vehicle component 126 such that the first projections 208 are bent to contact the plate member 212 for coupling the main body 202 to the vehicle component 126. In another example, the fixed portion 206 may include a tab member (not shown) projecting therefrom. The tab member may pass through the vehicle component 126 and engage with the plate member 212 for coupling the fixed portion 206 to the vehicle component 126. The tab member max be coupled to the plate member 212 using welding, brazing, soldering, and the like.

In some examples, the fixed portion 206 may be coupled to the vehicle component 126 using a pair of mechanical fasteners. The mechanical fasteners may be embodied as bolts, screws, pins, rivets, and the like. In yet another example, the fixed portion 206 may be directly coupled to the vehicle component 126 by welding, soldering, brazing, and the like. In some examples, adhesives may be used to couple the fixed portion 206 to the vehicle component 126.

Further, the main body 202 includes a lock stud 214 that is movable to switch the fastening member 200 between the locked position and the unlocked position. The lock stud 214 is movably coupled to the fixed portion 206. Specifically, the lock stud 214 rotates relative to the fixed portion 206. The lock stud is rotatable in a clockwise or an anticlockwise direction. The lock stud 214 is embodied as a knob that can be held and rotated to switch the fastening member 200 between the locked position and the unlocked position. The lock stud 214 includes a generally rectangular cross-section. Alternatively, the lock stud 214 may include a semi-circular cross-section, a circular cross-section, a square cross-section, a trapezoidal cross-section, and the like.

The fastening member 200 also includes a ring assembly 216 coupled to the panel 120 (see FIG. 2). The ring assembly 216 defines a first portion 218 disposed at the first side 122 of the panel 120 and a second portion 220 disposed at the second side 124 of the panel 120. The first portion 218 is embodied as an eyelet that includes an oval shaped base portion 222 and a number of second projections 224 extending from the base portion 222. Alternatively, the base portion 222 may include a circular shape, a square shape, a rectangular shape, and the like. In the illustrated example, the first portion 218 include four second projections 224. Alternatively, the first portion 218 may include more than four second projections 224 or less than four second projections 224. In an example, the first portion 218 may include two second projections 224. The second projections 224 are equidistantly spaced along a periphery of the base portion 222. For coupling the first portion 218 to the panel 120, the second projections 224 align and pass through corresponding openings (not shown) in the panel 120 such that the second projections 224 are partially received within the panel 120 and partially project from the second side 124 of the panel 120.

Further, the first portion 218 includes the base portion 222. The base portion 222 defined a pair of first ends 230 disposed opposite to each other and a pair of second ends 232 disposed opposite to each other. The first portion 218 also includes one or more first tabs 234 projecting from the base portion 222, In an example, the first portion 218 includes two or more first tabs 234. In the illustrated example, the first portion 218 includes two first tabs 234. The first tabs 234 are disposed diagonally opposite to each other. The one or more first tabs 234 are inclined relative to the base portion 222. More particularly, a height of each first tabs 234 increases along a periphery of the base portion 222. A height of the first tab 234 is minimal or zero proximate to the first ends 230 whereas a maximum height "H1" of the first tab 234 is defined proximate to the second ends 232.

Further, the first portion 218 includes one or more second tabs 236 projecting from the base portion 222 and disposed adjacent to the one or more first tabs 234. Each second tab 236 is disposed proximate to the second ends 232. It should be noted that each second tab 236 is disposed adjacent to a location where the corresponding first tab 234 defines the maximum height "H1". The one or more second tabs 236 are parallel to the base portion 222. The first portion 218 includes two or more second tabs 236. In the illustrated example, the first portion 218 includes two second tabs 236. Further, the second tabs 236 define a height "H2". The maximum height "H1" defined by the one or more first tabs 234 is greater than the height "H2" of the one or more second tabs 236.

The first portion 218 also defines a first through-hole 226. A size and a shape of the first through-hole 226 is selected such that the lock stud 214 may easily pass therethrough for coupling or removal of the panel 120. In some examples, the size of the first through-hole 226 may be slightly greater than a size of the lock stud 214. The first through-hole 226 is generally oval in shape. Alternatively, the first through-hole 226 may include a circular shape, a square shape, a rectangular shape, and the like.

Figure 4:
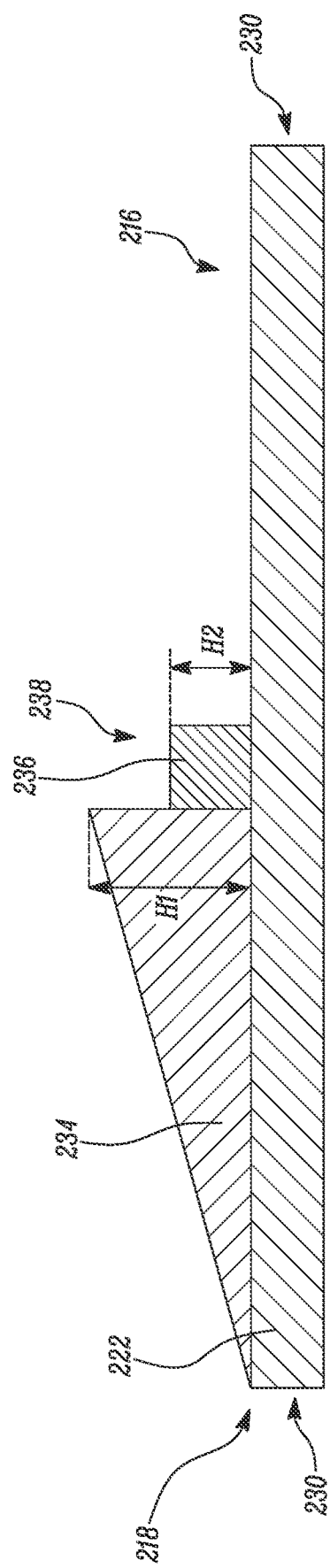
FIG. 4 illustrates a cross-sectional view of a first portion of a ring assembly associated with the fastening member of FIG. 2.

As shown in FIG. 4, the one or more first tabs 234 and the one or more second tabs 236 together define a seating portion 238 that receives a portion of the lock stud 214 when the fastening member 200 is in the locked position. More particularly, each first tab 234 and an adjacently disposed second tab 236 together define the seating portion 238. In the illustrated example, the first portion 218 includes two seating portions 238.

The fastening member 200 also includes the second portion 220. The second portion 220 is coupled to the first portion 218 and the panel 120 (see FIG. 2). The second portion 220 is generally oval in shape. Alternatively, the second portion 220 may include a circular shape, a square shape, a rectangular shape, and the like. The second portion 220 defines a second through-hole 240. A size and a shape of the second through-hole 240 is selected such that the lock stud 214 may easily pass therethrough for coupling or removal of the panel 120. In some examples, the size of the second through-hole 240 may be slightly greater than the size of the lock stud 214. The second through-hole 240 is generally oval in shape. Alternatively, the second through-hole 240 may include a circular shape, a square shape, a rectangular shape, and the like.

For coupling the first portion 218 and the second portion 220 to the panel 120, the second projections 224 pass through the corresponding openings in the panel 120. Further, the second portion 220 is disposed such that first through-hole 226 and the second through-hole 240 align with each other. Subsequently, the second projections 224 are bent such that the second projections 224 contact the second portion 220, thereby coupling the first portion 218 and the second portion 220 to the panel 120. Further, when the panel 120 is to be coupled to the vehicle component 126, the lock stud 214 is aligned with each of the first and second through-holes 226, 240. The lock stud 214 is then rotated in the clockwise direction relative to the first portion 218 and the second portion 220.

Figure 5:
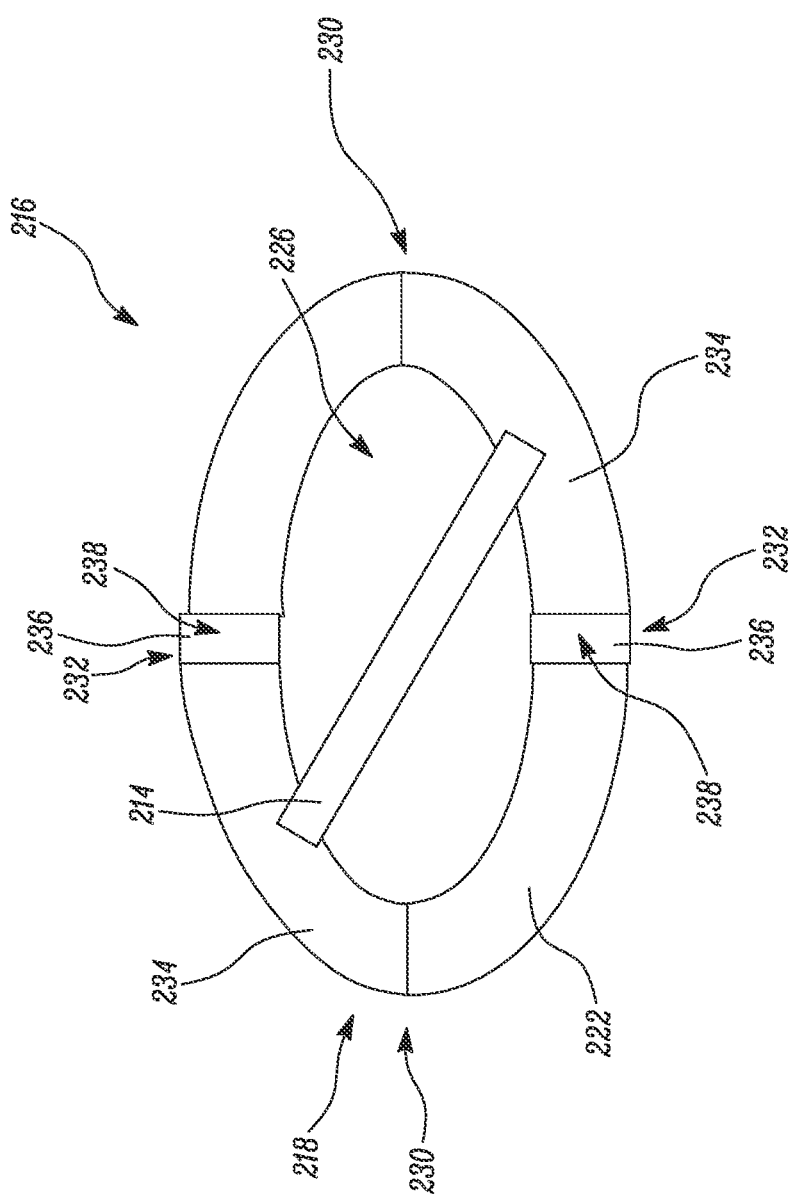
FIG. 5 illustrates a top view of the fastening member of FIG. 2.
Figure 6:
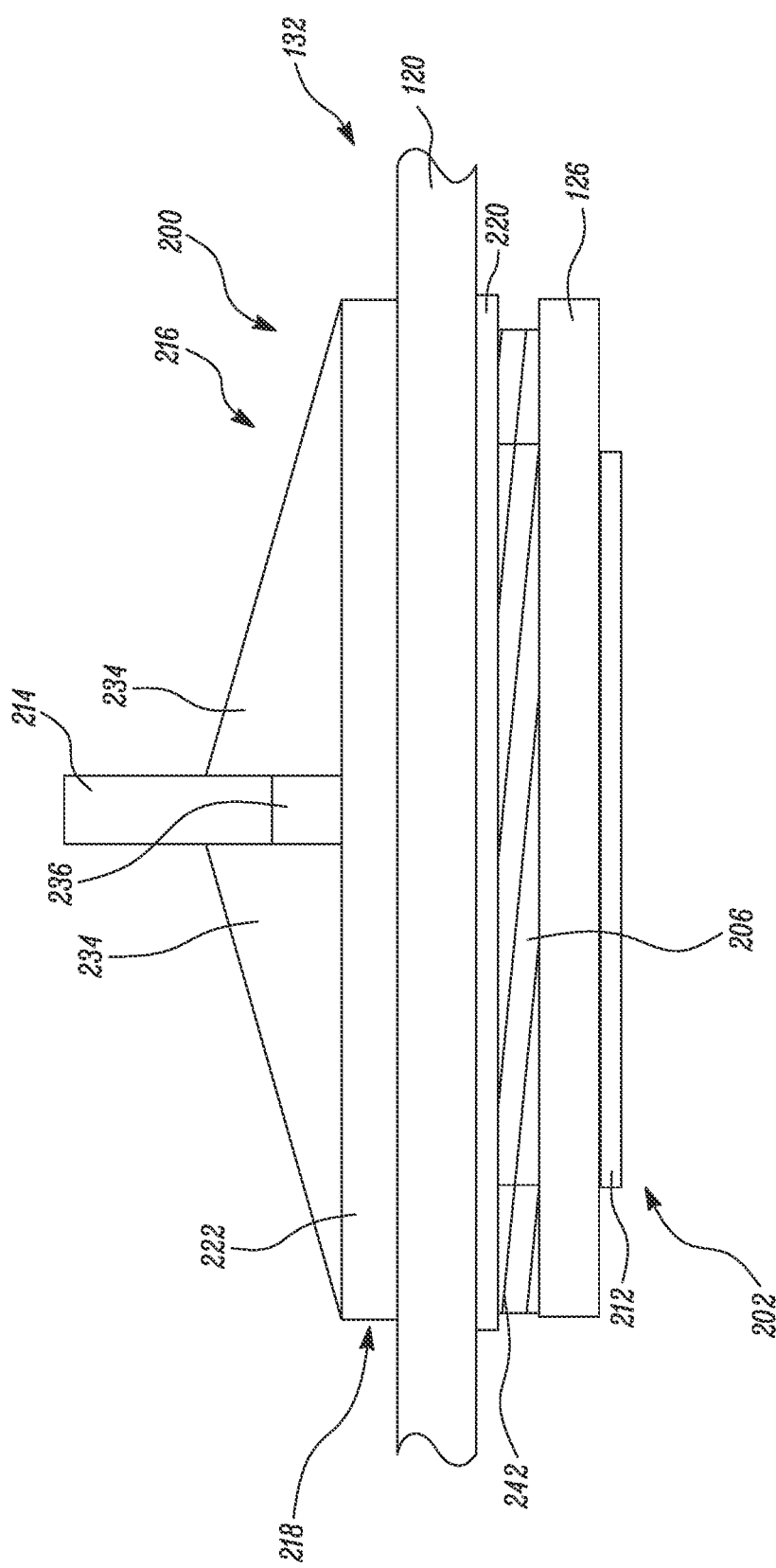
FIG. 6 illustrates a schematic view of the fastening member in a locked position.

As illustrated in FIG. 5, a portion of the lock stud 214 contacts each first tab 234 as the fastening member 200 is switched from the unlocked position to the locked position. FIG. 6 illustrates the fastening member 200 in the locked position. As illustrated, the lock stud 214 is rotated till some portion of the lock stud 214 is received within each seating portion 238 (see FIGS. 3 to 5). Such a rotation of the lock stud 214 couples the panel 120 to the vehicle component 126. Further, when the panel 120 is to be released, the lock stud 214 is rotated relative to the first portion 218 and the second portion 220 such that the fastening member 200 is in the unlocked position. The lock stud 214 may be rotated in the anticlockwise direction.

Further, the fastening member 200 also include a compressible member 242 coupled to the main body 202. In an example, the compressible member 242 includes a spring. Alternatively, the compressible member 242 may include any other type of member that compresses or is flexible in nature. When the panel 120 is coupled to the vehicle component 126, the compressible member 242 is disposed between the vehicle component 126 and the panel 120. The compressible member 242 surrounds the fixed portion 206. Further, the compressible member 242 may be coupled to the fixed portion 206. In an example, joining techniques such as welding, brazing, soldering, and the like may be used to couple the compressible member 242 to the fixed portion 206 of the main body 202. Alternatively, adhesives may be used to couple the compressible member 242 to the fixed portion 206 of the main body 202.

Figure 7:
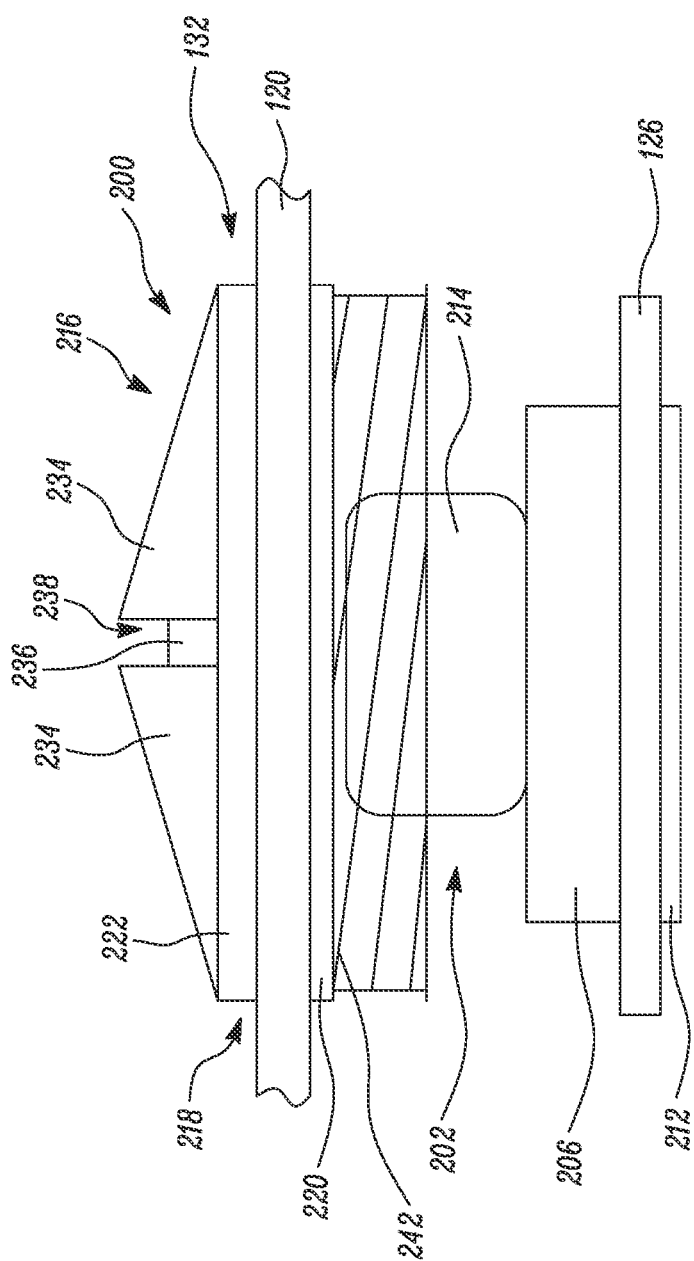
FIG. 7 illustrates a schematic view of the fastening member including a compressible member.

In an alternate example, as illustrated in FIG. 7, the compressible member 242 is coupled to the second portion 220 of the ring assembly 216. In such an example, the compressible member 242 surrounds the fixed portion 206 when the fastening member 200 is in the locked position. Further, the compressible member 242 may be coupled to the second portion 220 of the ring assembly 216 using joining techniques such as welding, brazing, soldering, and the like. Alternatively, adhesives may be used to couple the compressible member 242 to the fixed portion 206 of the main body 202. In an example, the compressible member 242 includes a spring. Alternatively, the compressible member 242 may include any other type of member that compresses or is flexible in nature.

Figure 8:
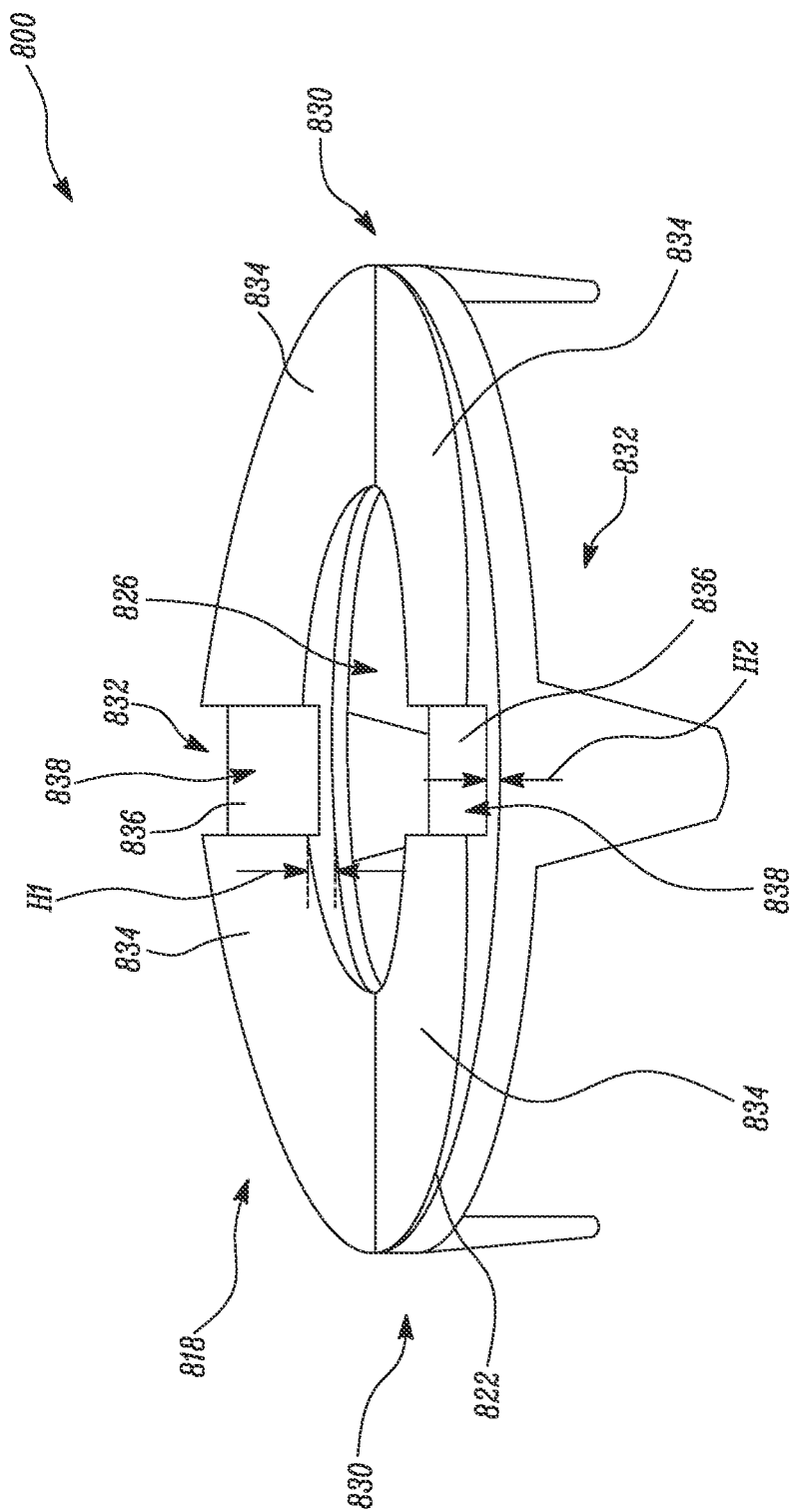
FIG. 8 illustrates another design of a first portion of the ring assembly associated with the fastening member of FIG. 2.

FIG. 8 illustrates another design of a first portion 818 associated with the ring assembly 216 (see FIGS. 2 and 3) of the fastening member 200. A size and a shape of the first portion 818 is similar to the size and the shape of the first portion 218 explained in relation to FIGS. 2 and 5. Further, the first portion 818 includes a base portion 822. The base portion 822 defines a pair of first ends 830 disposed opposite to each other and a pair of second ends 832 disposed opposite to each other. The first portion 818 also includes one or more first tabs 834 projecting from the base portion 822. In the illustrated example, the first portion 818 includes four first tabs 834. The first tabs 834 are disposed along a periphery of the base portion 822. The first tabs 834 are inclined relative to the base portion 822. More particularly, a height of each first tabs 834 increases along a periphery of the base portion 822. The height of the first tab is minimal or zero proximate to the first ends 830 whereas a maximum height "H1" of the first tab 834 is defined proximate to the second ends 832.

Further, the first portion 818 includes the second tabs 836 projecting from the base portion 822 and disposed adjacent to the first tabs 834. Each second tab 836 is disposed proximate to the second ends 832. It should be noted that each second tab 836 is disposed adjacent to a location where the corresponding first tab 834 defines the maximum height "H1". In the illustrated example, each second tab 836 is disposed between a pair of the first tabs 834. The one or more second tabs 836 are parallel to the base portion 822. In the illustrated example, the first portion 818 includes two second tabs 836. Further, the second tabs 836 define a height "H2". The maximum height "H1" defined by the first tabs 834 is greater than the height "H2" of the second tabs 836. Further, each first tab 834 and an adjacently disposed second tab 836 together define a seating portion 838 that receives a portion of the lock stud 214 (see FIGS. 2 and 3) when the fastening member 200 is in the locked position. In the illustrated example, the first portion 818 includes two seating portions 838. Each seating portion 838 is defined by the first tabs 834 and the second tab 836.

INDUSTRIAL APPLICABILITY

The present disclosure relates to the fastening member 200 for coupling of two components of the construction vehicle 100. The fastening member 200 described herein provides a tight fitting between two components. The fastening member 200 provides vibration dampening which prevents rattling, thereby reducing a possibility of component failure. The fastening member 200 may increase an operating life of the vehicle component 126 and the panel 120 by preventing component failure. Further, the fastening member 200 may be used to couple various panels made of light-weight materials, sheet metals, or non-metallic materials, such as plastics. Further, the fastening member 200 allows coupling of the panel 120 and the vehicle component 126 without any requirement of additional tools or fixtures. Thus, a user may easily and quickly couple or remove two components using such fastening member 200.

The fastening member 200 provides a tightening feature by incorporating the first tabs 234, 834 and second tabs 236, 836 which ensures improved and reliable coupling between the panel 120 and the vehicle component 126. Specifically, the first tabs 234, 834 and second tabs 236, 836 provide an improved clamping force. In some examples, the fastening member 200 may also include a compressible member 242 coupled to the lock stud 214 or the ring assembly 216 to add additional clamping force and vibration dampening.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A construction vehicle comprising:
   a panel removably coupled to a vehicle component, the panel defining a first side and a second side; and
   a fastening member for removably coupling the panel to the vehicle component, wherein the fastening member is movable between a locked position and an unlocked position, the fastening member including:
   a main body coupled to the vehicle component, the main body including a lock stud that is movable to switch the fastening member between the locked position and the unlocked position; and
   a ring assembly coupled to the panel, the ring assembly defining a first portion disposed at the first side of the panel and a second portion disposed at the second side of the panel, wherein the first portion includes:
   a base portion;
   one or more first tabs projecting outwardly from the base portion, wherein the one or more first tabs are inclined relative to the base portion; and one or more second tabs projecting outwardly from the base portion and disposed adjacent to the one or more first tabs, wherein the one or more second tabs are parallel to the base portion, and wherein the one or more first tabs and the one or more second tabs together define a seating portion that receives a portion of the lock stud when the fastening member is in the locked position, the lock stud being configured to be received in the seating portion of the base portion such that a portion of the lock stud contacts one or more first tabs.

2. The construction vehicle of claim 1, wherein the first portion includes at least two first tabs.

3. The construction vehicle of claim 1, wherein the first portion includes four first tabs.

4. The construction vehicle of claim 1, wherein the first portion includes at least two second tabs.

5. The construction vehicle of claim 1, wherein the fastening member further includes a compressible member coupled to the main body.

6. The construction vehicle of claim 5, wherein the compressible member is coupled to the second portion of the ring assembly.

7. The construction vehicle of claim 5, wherein the compressible member includes a spring.

8. The construction vehicle of claim 1, wherein a maximum height defined by the one or more first tabs is greater than a height of the one or more second tabs.

9. A panel assembly comprising:
   a panel removably coupled to a component, the panel defining a first side and a second side; and
   a fastening member for removably coupling the panel to the component, wherein the fastening member is movable between a locked position and an unlocked position, the fastening member including:
      a main body coupled to the component, the main body including a lock stud that is movable to switch the fastening member between the locked position and the unlocked position; and
      a ring assembly coupled to the panel, the ring assembly defining a first portion disposed at the first side of the panel and a second portion disposed at the second side of the panel, wherein the first portion includes:
         a base portion;
         one or more first tabs projecting outwardly from the base portion, wherein the one or more first tabs are inclined relative to the base portion; and
         one or more second tabs projecting outwardly from the base portion and disposed adjacent to the one or more first tabs, wherein the one or more second tabs are parallel to the base portion, and wherein the one or more first tabs and the one or more second tabs together define a seating portion that receives a portion of the lock stud when the fastening member is in the locked position, the lock stud being configured to be received in the seating portion of the base portion such that a portion of the lock stud contacts one or more first tabs.

10. The panel assembly of claim 9, wherein the first portion includes at least two first tabs.

11. The panel assembly of claim 9, wherein the first portion includes four first tabs.

12. The panel assembly of claim 9, wherein the first portion includes at least two second tabs.

13. The panel assembly of claim 9, wherein the fastening member further includes a compressible member coupled to the main body.

14. The panel assembly of claim 13, wherein the compressible member is coupled to the second portion of the ring assembly.

15. The panel assembly of claim 13, wherein the compressible member includes a spring.

16. A fastening member for removably coupling a first component to a second component, wherein the fastening member is movable between a locked position and an unlocked position, the fastening member including:
   a main body coupled to the second component, the main body including a lock stud that is movable to switch the fastening member between the locked position and the unlocked position; and
   a ring assembly coupled to the first component, the ring assembly defining a first portion disposed at a first side of the first component and a second portion disposed at a second side of the first component, wherein the first portion includes:
      a base portion;
      one or more first tabs projecting outwardly from the base portion, wherein the one or more first tabs are inclined relative to the base portion; and
      one or more second tabs projecting outwardly from the base portion and disposed adjacent to the one or more first tabs, wherein the one or more second tabs are parallel to the base portion, and wherein the one or more first tabs and the one or more second tabs together define a seating portion that receives a portion of the lock stud when the fastening member is in the locked position, the lock stud being configured to be received in the seating portion of the base portion such that a portion of the lock stud contacts one or more first tabs, wherein a maximum height defined by the one or more first tabs is greater than a height of the one or more second tabs.

17. The fastening member of claim 16, wherein the first portion includes at least two first tabs.

18. The fastening member of claim 16, wherein the first portion includes four first tabs.

19. The fastening member of claim 16, further comprising a compressible member coupled to the main body.

20. The fastening member of claim 19, wherein the compressible member is coupled to the second portion of the ring assembly.

* * * * *